United States Patent
Jiang et al.

(10) Patent No.: US 9,255,838 B2
(45) Date of Patent: Feb. 9, 2016

(54) SYSTEM FOR MEASURING LIGHT INTENSITY DISTRIBUTION

(71) Applicants: Kai-Li Jiang, Beijing (CN); Jun Zhu, Beijing (CN); Chen Feng, Beijing (CN); Shou-Shan Fan, Beijing (CN)

(72) Inventors: Kai-Li Jiang, Beijing (CN); Jun Zhu, Beijing (CN); Chen Feng, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/729,279

(22) Filed: Dec. 28, 2012

(65) Prior Publication Data

US 2013/0329220 A1   Dec. 12, 2013

(30) Foreign Application Priority Data

Jun. 12, 2012   (CN) .......................... 2012 1 0192085

(51) Int. Cl.
*G01J 1/02* (2006.01)
*G01J 1/58* (2006.01)
*G01J 1/42* (2006.01)

(52) U.S. Cl.
CPC ............... *G01J 1/02* (2013.01); *G01J 1/0242* (2013.01); *G01J 1/4228* (2013.01); *G01J 1/58* (2013.01); *G01J 2001/4247* (2013.01)

(58) Field of Classification Search
CPC ............. G01J 1/02; G01J 1/4228; G01J 1/58; G01J 1/0242; G01J 1/4257
USPC .............. 356/213–218, 445; 427/77, 78, 554; 977/742, 840, 843, 855
See application file for complete search history.

(56) References Cited

U.S. PATENT DOCUMENTS

| | | | |
|---|---|---|---|
| 6,890,230 B2 * | 5/2005 | Trujillo et al. | 445/6 |
| 7,733,479 B2 * | 6/2010 | Shew et al. | 356/244 |
| 7,749,477 B2 * | 7/2010 | Jiang et al. | 423/447.1 |
| 7,811,149 B2 * | 10/2010 | Liu et al. | 445/46 |
| 7,820,133 B2 * | 10/2010 | Chen et al. | 423/447.3 |
| 7,838,843 B2 * | 11/2010 | Kawakami et al. | 250/432 R |
| 7,960,904 B2 * | 6/2011 | Takai et al. | 313/311 |
| 8,030,619 B2 * | 10/2011 | Maltz | 250/389 |
| 8,077,318 B2 * | 12/2011 | Luo et al. | 356/445 |
| 8,471,132 B1 * | 6/2013 | Jiang et al. | 423/256 |
| 8,491,970 B2 * | 7/2013 | Strauss et al. | 427/474 |

(Continued)

FOREIGN PATENT DOCUMENTS

| | | |
|---|---|---|
| CN | 1493857 | 5/2004 |
| CN | 101634676 | 1/2010 |

(Continued)

OTHER PUBLICATIONS

"Electronic diagnostics system for the analysis of laser beam profile", Bushra. R. Mehdi et al., Iraqi Journal of Physics, 2011, vol. 9, No. 16, pp. 1-5.

*Primary Examiner* — Sang Nguyen
(74) *Attorney, Agent, or Firm* — Novak Druce Connolly Bove + Quigg LLP (57) ABSTRACT

A system for measuring intensity distribution of light includes a carbon nanotube array and an imaging element. The carbon nanotube array is placed in an environment of inert gas or a vacuum environment. The carbon nanotube array absorbs photons of a light source and radiates radiation light. The imaging element is used to image the radiation light. The carbon nanotube array is between the light source and the imaging element.

18 Claims, 5 Drawing Sheets

(56) References Cited

U.S. PATENT DOCUMENTS

| | | | |
|---|---|---|---|
| 8,508,049 B2 * | 8/2013 | Berg et al. | 257/774 |
| 8,808,810 B2 * | 8/2014 | Veerasamy | 427/508 |
| 2002/0167375 A1 * | 11/2002 | Hoppe et al. | 333/186 |
| 2003/0173985 A1 | 9/2003 | Cole et al. | |
| 2005/0040314 A1 | 2/2005 | Kuo | |
| 2005/0258737 A1 * | 11/2005 | Shin | 313/496 |
| 2006/0068195 A1 * | 3/2006 | Majumdar et al. | 428/323 |
| 2007/0268491 A1 * | 11/2007 | Tan et al. | 356/399 |
| 2007/0290597 A1 * | 12/2007 | Lo et al. | 313/310 |
| 2008/0088845 A1 * | 4/2008 | Ke et al. | 356/445 |
| 2008/0129278 A1 * | 6/2008 | Dai et al. | 324/109 |
| 2008/0143238 A1 * | 6/2008 | Li et al. | 313/491 |
| 2008/0292840 A1 * | 11/2008 | Majumdar et al. | 428/114 |
| 2009/0140167 A1 * | 6/2009 | Ward et al. | 250/458.1 |
| 2009/0167146 A1 * | 7/2009 | Yang et al. | 313/495 |
| 2009/0252886 A1 * | 10/2009 | Barker et al. | 427/523 |
| 2010/0000607 A1 * | 1/2010 | Hanley et al. | 136/265 |
| 2010/0019171 A1 * | 1/2010 | Jiang et al. | 250/473.1 |
| 2010/0068406 A1 * | 3/2010 | Man | 427/469 |
| 2010/0072872 A1 * | 3/2010 | Legagneux et al. | 313/2.1 |
| 2010/0277735 A1 * | 11/2010 | Luo et al. | 356/400 |
| 2010/0296088 A1 * | 11/2010 | Xiao et al. | 356/319 |
| 2011/0063613 A1 * | 3/2011 | Sun et al. | 356/301 |
| 2011/0143045 A1 * | 6/2011 | Veerasamy | 427/495 |
| 2012/0027173 A1 * | 2/2012 | Duerr | 378/62 |
| 2013/0327937 A1 * | 12/2013 | Jiang et al. | 250/307 |
| 2013/0327960 A1 * | 12/2013 | Zhu et al. | 250/461.1 |

FOREIGN PATENT DOCUMENTS

| | | |
|---|---|---|
| CN | 101893659 | 11/2010 |
| TW | 587156 | 5/2004 |
| TW | 591216 | 6/2004 |
| TW | 200936992 | 9/2009 |
| TW | 201011266 | 3/2010 |
| TW | 201043933 | 12/2010 |
| WO | WO2009147908 | 12/2009 |

* cited by examiner

SYSTEM FOR MEASURING LIGHT INTENSITY DISTRIBUTION

RELATED APPLICATIONS

This application claims all benefits accruing under 35 U.S.C. §119 from China Patent Application No. 201210192085.9, filed on Jun. 12, 2012 in the China Intellectual Property Office. This application is related to commonly-assigned application Ser. Nos. 13/729,300, entitled, "METHOD FOR MEASURING LIGHT INTENSITY DISTRIBUTION", filed Dec. 28, 2012; 13/729,285 "SYSTEM FOR MEASURING LIGHT INTENSITY DISTRIBUTION", filed Dec. 28, 2012. 13/729,522; "METHOD FOR MEASURING LIGHT INTENSITY DISTRIBUTION", filed Dec. 28, 2012. Disclosures of the above-identified applications are incorporated herein by reference.

BACKGROUND

1. Technical Field

The present application relates to a system for measuring light intensity distribution.

2. Discussion of Related Art

To measure the intensity distribution of a light source, a sensor is put in a position away from the light source. Then the sensor is moved around a circumference of a circle with the light source at the circle center. It is necessary to move the sensor to obtain multiple test data while measuring an intensity distribution of the light source.

The sensors used in measuring intensity distribution of light can be classified into two types: thermal and photonic. The thermal sensors are low-cost and can be operated at room temperature but have low sensitivity and low response speed. The photonic sensors have high sensitivity and high response speed. However, the photonic sensors are expensive and cannot operate at room temperature.

What is needed, therefore, is to provide a system for measuring intensity distribution of a light at room temperature with high sensitivity and resolution.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
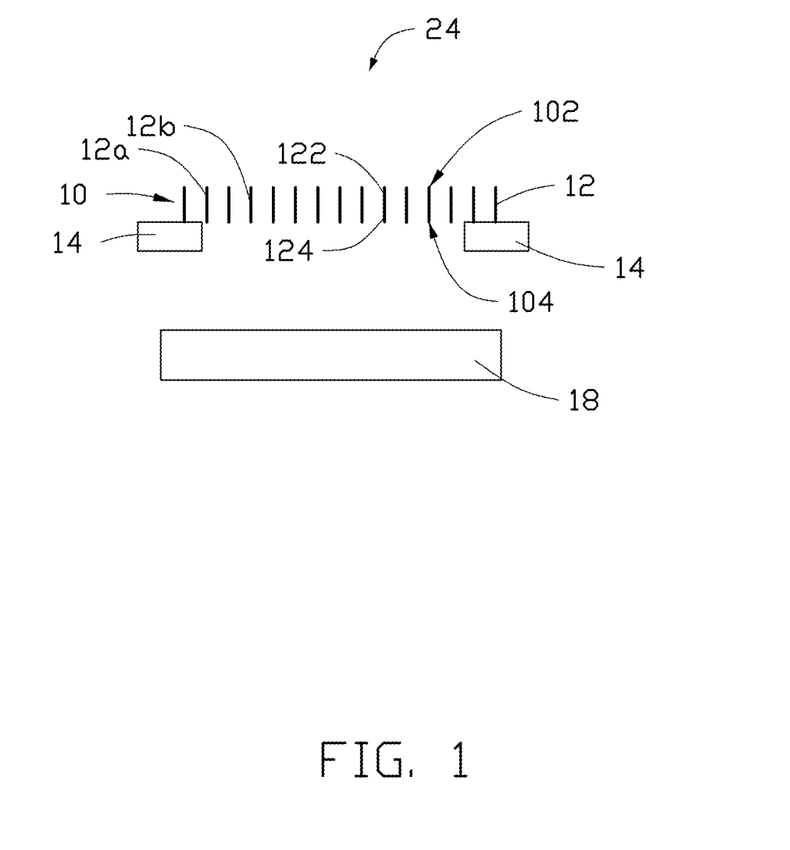
FIG. 1 is a schematic view showing a system of one embodiment for measuring light intensity distribution.

FIG. 1 is a system 24 for measuring light intensity distribution of one embodiment. The system 24 includes a carbon nanotube array 10 and an imaging element 18. The carbon nanotube array 10 has a top surface 102 and a bottom surface 104 opposite to the top surface 102. The imaging element 18 is separated from the carbon nanotube array 10 and nearer to the bottom surface 104 of the carbon nanotube array 10 than the top surface 102.

The carbon nanotube array 10 is made by chemical vapor deposition (CVD) process in one embodiment. The chemical vapor deposition process includes steps of:

(S1), providing a substantially flat and smooth substrate, wherein the substrate can be a P-type silicon substrate, an N-type silicon substrate, or a silicon substrate having oxide layer disposed thereon; in one embodiment, the substrate is a P-type silicon substrate having a width of about 4 inches;

(S2), forming a catalyst on a surface of the substrate, wherein the catalyst can be made of iron, cobalt, nickel, or any combination alloy thereof;

(S3), annealing the substrate with the catalyst at a temperature ranging from about 700° C. to about 900° C. in air for about 30 minutes to about 90 minutes;

(S4), heating the substrate with the catalyst at a temperature ranging from about 500° C. to about 740° C. in a furnace with a protective gas therein; and (S5), supplying a carbon source gas to the furnace for about 5 minutes to about 30 minutes and growing the carbon nanotube array 10 on the substrate, wherein the carbon source gas may be hydrocarbon gas, such as ethylene, methane, acetylene, ethane, or any combination thereof.

Moreover, the carbon nanotube array 10 formed under the above conditions is essentially free of impurities such as carbonaceous or residual catalyst particles.

The carbon nanotube array 10 includes a plurality of carbon nanotubes 12 substantially parallel to each other. The plurality of carbon nanotubes 12 may be single-walled, double-walled, multi-walled carbon nanotubes, or their combinations. The plurality of carbon nanotubes 12, which is single walled has a diameter of about 0.5 nanometers (nm) to about 50 nm. The plurality of carbon nanotubes 12, which is double walled has a diameter of about 1.0 nm to about 50 nm. The plurality of carbon nanotubes 12, which is multi-walled has a diameter of about 1.5 nm to about 50 nm. The plurality of carbon nanotubes 12 has a height of about 100 nm to about 10 millimeters (mm), for example, the height of the plurality of carbon nanotubes 12 is 100 microns, 500 microns, 1000 microns or 5 mm. In one embodiment, the plurality of carbon nanotubes 12 is multi-walled carbon nanotubes and has a height of about 100 microns to about 1000 microns.

Figure 5:
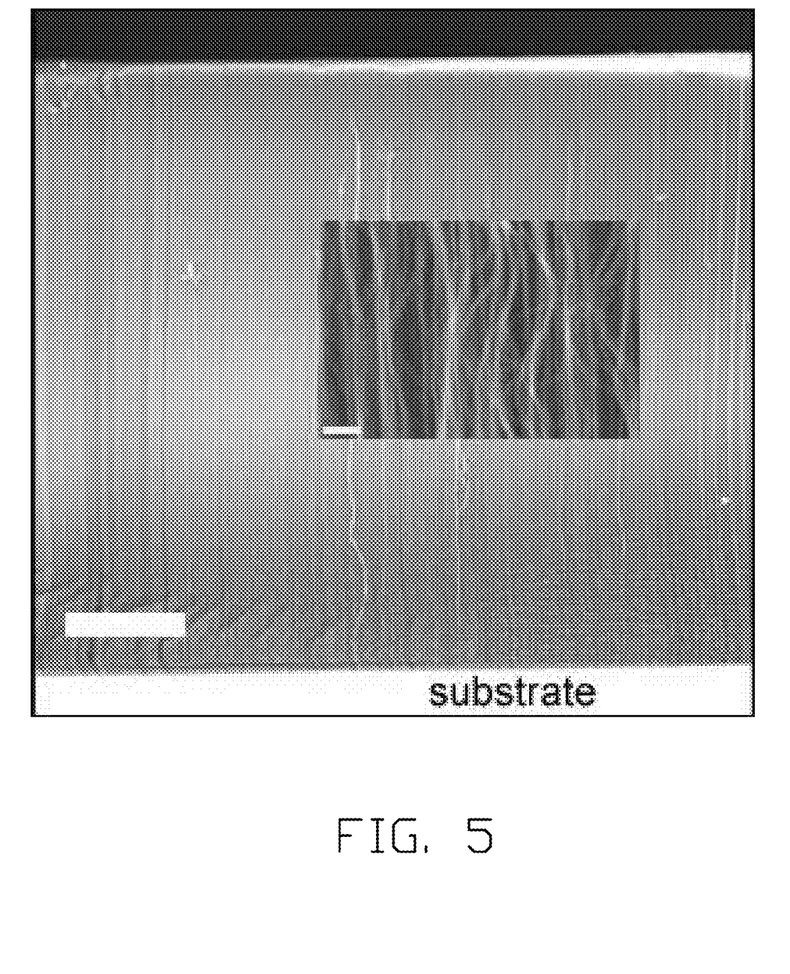
FIG. 5 shows a scanning electron microscope (SEM) image of a carbon nanotube array.

An angle between the plurality of carbon nanotubes 12 and the surface of the substrate can be in a range from about 10 degrees to about 90 degrees. In one embodiment, the angle between the plurality of carbon nanotubes 12 and the surface of the substrate is in a range from about 60 degrees to about 90 degrees. As shown in FIG. 5, in one embodiment, the plurality of carbon nanotubes 12 is perpendicular to the surface of the substrate. Each of the plurality of carbon nanotubes 12 includes a top end and a bottom end opposite to the top end. The top ends of the plurality of carbon nanotubes 12 are away from the substrate, and the bottom ends of the plurality of carbon nanotubes 12 connect to the surface of the substrate.

The plurality of carbon nanotubes 12 in the carbon nanotube array 10 can be pressed using a compressing apparatus, to form the angle between the plurality of carbon nanotubes 12 and the surface of the substrate, wherein the angle can be less than 90 degrees. In detail, a certain pressure can be applied to the carbon nanotube array 10 by the compressing apparatus. In one embodiment, the compressing apparatus can be a pressure head having a glossy surface. When a planar pressure head is used to press the carbon nanotube array along a pressing direction slanted to the surface of the substrate, the angle between the plurality of carbon nanotubes 12 and the surface of the substrate will be obtained. The pressure and the pressing direction can, opportunely, determine a size of the angle between the plurality of carbon nanotubes 12 and the surface of the substrate.

The carbon nanotube array 10 can be totally stripped from the substrate. In one embodiment, the carbon nanotube array 10 is totally scraped from the substrate by a knife or other similar devices along a direction parallel to the surface of the substrate. In the process of scraping, adjacent two of the carbon nanotubes 12 join together by van der Waals attractive force, therefore, the carbon nanotube array 10 has free-standing structure.

The term "free-standing" includes, but not limited to, the carbon nanotube array 10 that does not have to be supported by a substrate. For example, a free-standing carbon nanotube array 10 can sustain itself when it is hoisted by a portion thereof without any significant damage to its structural integrity. So, if the free-standing carbon nanotube array 10 is placed between two separate supporters 14, a portion of the free-standing carbon nanotube array 10, not in contact with the two supporters, would be suspended between the two supporters 14 and yet maintain structural integrity.

The carbon nanotube array 10 stripped from the substrate includes the plurality of carbon nanotubes 12. Angles between the plurality of carbon nanotubes 12 and the top surface 102 of the carbon nanotube array 10 can be in a range from about 10 degrees to about 90 degrees. In one embodiment, angles between the plurality of carbon nanotubes 12 and the top surface 102 of the carbon nanotube array 10 is in a range from about 60 degrees to about 90 degrees. In one embodiment, the plurality of carbon nanotubes 12 is perpendicular to the top surface 102 of the carbon nanotube array 10.

The carbon nanotube array 10 can be placed between at least two separate supporters 14 or on a ring base. The ring base can be made of a thermal insulating material, such as, calcium carbonate, polystyrene, polyvinyl chloride, polyurethane, for example. In one embodiment, the ring base is made of polystyrene. The carbon nanotube array 10 can be placed on a substrate which is made of light-transparent and thermal insulating material, such as glass, resin or zinc selenide (ZnSe). In one embodiment, the substrate is made of ZnSe.

Figure 2:
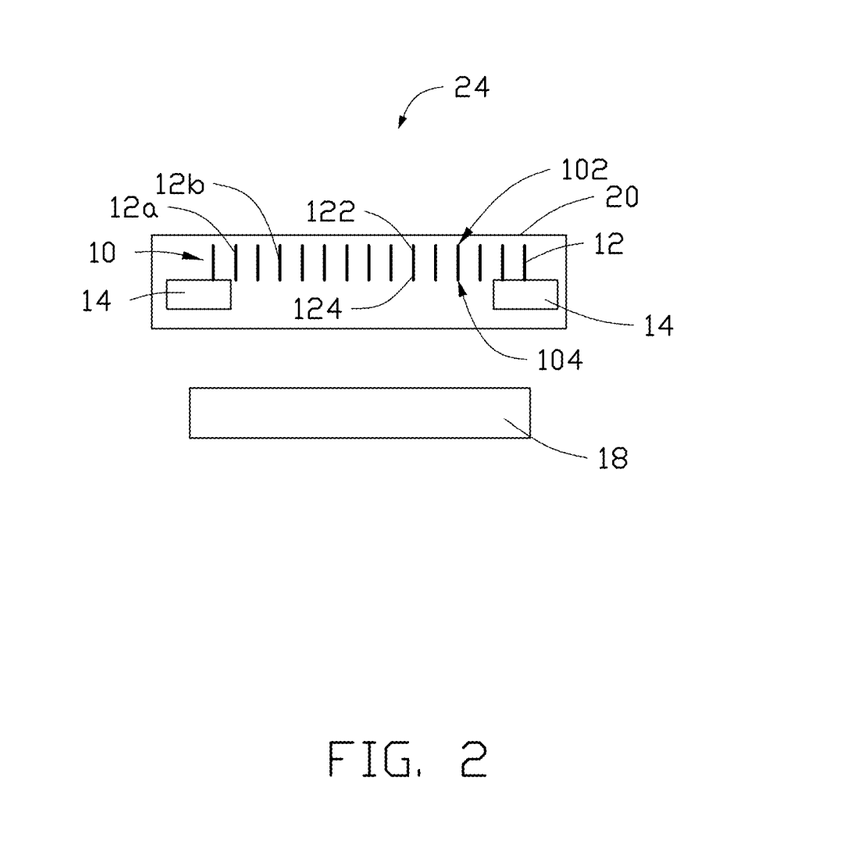
FIG. 2 is a schematic view showing a system of another embodiment for measuring light intensity distribution.
Figure 3:
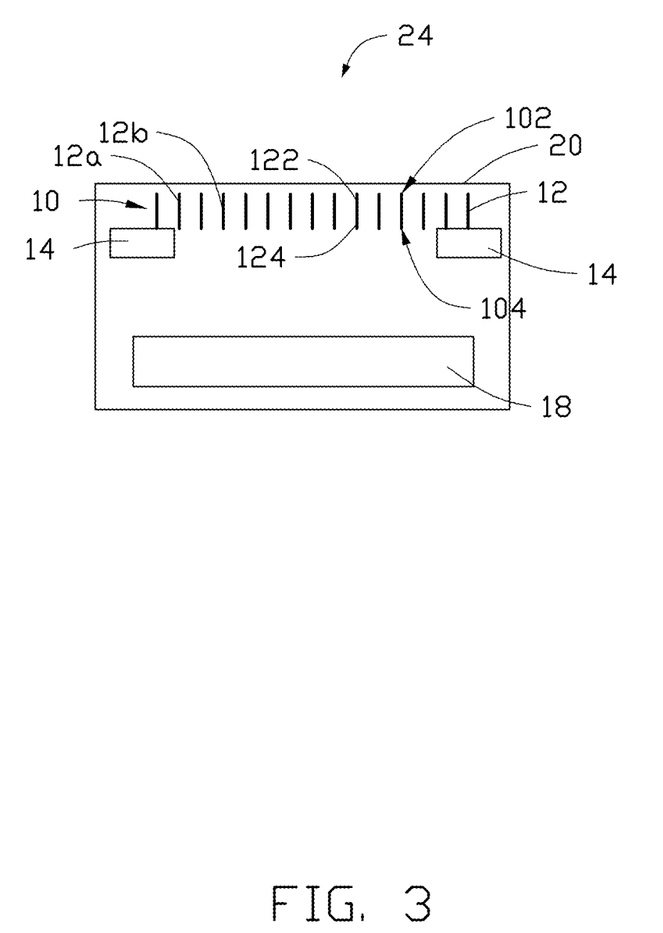
FIG. 3 is a schematic view showing a system of yet another embodiment for measuring light intensity distribution.

The carbon nanotube array 10 can be suspended in an inert gas environment or a vacuum environment by at least two separate supporters 14 or on the ring base. As shown in FIG. 2, in one embodiment, the carbon nanotube array 10 is located in a chamber 20. As shown in FIG. 3, in another embodiment, the carbon nanotube array 10 and the imaging element 18 are placed in the chamber 20. The chamber 20 is made of light-transparent materials, such as glass, resin or zinc selenide (ZnSe). The chamber 20 can be filled with nitrogen, ammonia or inertia gas. In another embodiment, a pressure in the chamber 20 can be in a range from about $10^{-9}$ Pa to about $10^{-3}$ Pa.

Each of the plurality of carbon nanotubes 12 has a top end 122 and a bottom end 124 opposite to the top end 122. The top end 122 of each of the carbon nanotubes 12 is close to a light source. The bottom end 124 of each of the carbon nanotubes 12 is away from the light source. Each of the carbon nanotubes 12 orients along a direction from the bottom surface 104 to the top surface 102 of the carbon nanotube array 10.

Each of the plurality of carbon nanotubes 12 has heat conduction anisotropy. Heat is conducted along the axes of the plurality of carbon nanotubes 12 and is hardly conducted along a direction vertical to the axes of the plurality of carbon nanotubes 12. Therefore, when the carbon nanotube array 10 radiates radiation light, the top surface 102 and the bottom surface 104 of the carbon nanotube array 10 radiates more radiation light. Side surfaces of the carbon nanotube array 10 hardly radiate radiation light, wherein the side surface is parallel to the axes of the plurality of carbon nanotubes 12. Therefore, the imaging element 18 can be nearer to the bottom surface 104 of the carbon nanotube array 10 than the top surface 102. In one embodiment, the plurality of carbon nanotubes 12 of the carbon nanotube array 10 is substantially perpendicular to a surface of the imaging element 18.

A distance between the imaging element 18 and the bottom surface 104 of the carbon nanotube array 10 can be in a range from about 1 mm to about 100 mm. In one embodiment, the chamber 20 is between the imaging element 18 and the light source. The chamber 20 is separated from the imaging element 18. The imaging element 18 can be a charge-coupled device (CCD), a complementary metal-oxide-semiconductor (CMOS). In one embodiment, the imaging element 18 is a CCD.

Figure 4:
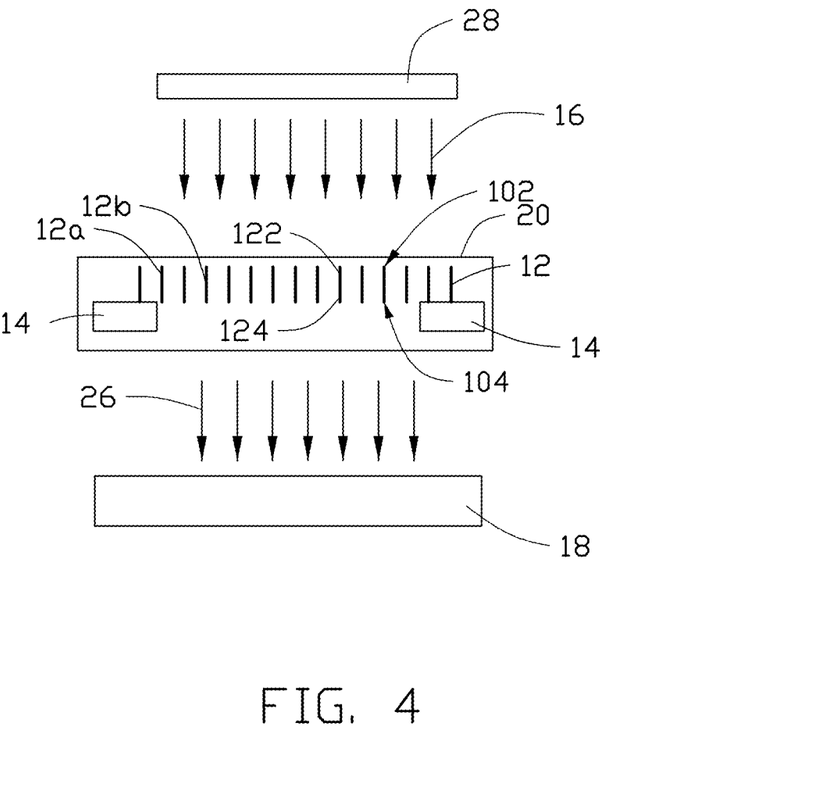
FIG. 4 is a schematic view showing an optical path with the system for measuring light intensity distribution of FIG. 2.

FIG. 4 illustrates a method for measuring light intensity distribution of one embodiment with the system 24. The method includes the following steps:

(S21), suspending the carbon nanotube array 10 in an inert gas environment or a vacuum environment;

(S22), irradiating the top surface 102 of the carbon nanotube array 10 with a light source 28 to make the carbon nanotube array 10 radiate a radiation light 26;

(S23), imaging the radiation light 26 radiated by the carbon nanotube array 10 with the imaging element 18 to obtain an intensity distribution of the light source 28.

In step (S22), the light source 28 can emit infrared light, visible light or ultraviolet light. In one embodiment, an infrared light is used as the light source 28. The top surface 102 of the carbon nanotube array 10 is nearer to the light source 28 than the bottom surface 104. The bottom surface 104 is away from the light source 28.

In step (S22), an irradiating angle of the light source 28 can be selected according to need, which is between the light beam 16 from the light source 28 and the top surface 102 of the carbon nanotube array 10. In one embodiment, the irradiating angle is 90 degrees such that the light beam 16 is substantially vertical to the top surface 102 of the carbon nanotube array 10 and parallel to an axis of each of the carbon nanotubes 12.

While irradiating the top surface 102 of the carbon nanotube array 10 with the light beam 16 from the light source 28, the top surface 102 of the carbon nanotube array 10 absorbs photons of the light source 28 and produces heat and radiates radiation light 26, due to carbon nanotube array 10 having an ideal black body structure. The higher the intensity of the light source 28, the more photons that are absorbed by the top surface 102 of the carbon nanotube array 10, the more heat will be produced by the top surface 102, the higher the intensity of the radiation light 26. The plurality of carbon nanotubes 12 has heat conduction anisotropy. Heat is conducted along the axes of the plurality of carbon nanotubes 12 and is hardly conducted along a direction vertical to the axes of the plurality of carbon nanotubes 12. Therefore, the heat of each of the plurality of carbon nanotubes 12 has been conducted along a direction from the top end 122 to the bottom end 124, until each of the plurality of carbon nanotubes 12 has equal and uniform heat. Meanwhile, the carbon nanotube array 10 radiates the radiation light 26, due to carbon nanotube array 10 having the ideal black body structure.

In detail, when the light beam 16 irradiates the top surface 102 of the carbon nanotube array 10, for example, a light with a higher light intensity in the light beam 16 irradiates a top end 122 of a carbon nanotube 12A. The top end 122 of the carbon nanotube 12A absorbs photons of the light source 28 and produces more heat. The heat is conducted along the direction from the top end 122 to the bottom end 124, until the carbon nanotube 12A has equal and uniform heat. A light with a lower light intensity in the light beam 16 irradiates a top end 122 of a carbon nanotube 12B. The top end 122 of the carbon nanotube 12B absorbs photons of the light source 28 and produces less heat. The heat is conducted along the direction from the top end 122 to the bottom end 124, until the carbon nanotube 12B has equal and uniform heat. Heat of the carbon nanotube 12A is more than heat of the carbon nanotube 12B. Meanwhile, the carbon nanotubes 12A and 12B radiate the radiation lights 26, due to the plurality of carbon nanotubes 12 having the ideal black body structure. Therefore, a light intensity of the radiation light 26 radiated by the carbon nanotubes 12A is higher than a light intensity of the radiation light 26 radiated by the carbon nanotubes 12B.

Light intensity of the radiation light 26 radiated by each of the plurality of carbon nanotubes 12 in the carbon nanotube array 10 is related to light intensity of the light source 28. The higher the intensity of the radiation light 26 radiated by one of the plurality of carbon nanotubes 12, the more heat will be produced by the top end 122 of the plurality of carbon nanotubes 12, the higher the intensity of one light irradiating the top end 122 of the plurality of carbon nanotubes 12. The radiation light 26 can be infrared light, ultraviolet light, visible light for example. The type of the radiation light 26 is related to the heat produced by the carbon nanotube array 10 and a wavelength of the light beam 16 from the light source 28.

The plurality of carbon nanotubes 12 of the carbon nanotube array 10 is substantially parallel to each other. The adjacent two of the carbon nanotubes 12 are still connected to each other. When the light beam 16 irradiates the top surface 102, the light beam 16 does not pass through the interspace between adjacent two of the carbon nanotubes 12 and irradiates the imaging element 18. The imaging element 18 does not receive the light beam 16. The imaging element 18 only receives the radiation light 26 radiated from the carbon nanotube array 10 and image the radiation light 26.

In step (S23), after imaging the radiation light 26 radiated from the carbon nanotube array 10 with the imaging element 18, the intensity distribution of the light source 28 can be obtained by reading the imaging element 18. A computer can be used for reading the imaging element 18 to obtain the intensity distribution of the light source 28.

In summary, the system for measuring intensity distribution of light can be at room temperature. The system for measuring intensity distribution of light has higher sensitive and resolution. Moreover, the system for measuring intensity distribution of light is simple and easy to operate.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A system for measuring intensity distribution of light comprising:
    a carbon nanotube array configured to absorb photons of a light source and to radiate radiation light, wherein the carbon nanotube array is in a vacuum environment, the carbon nanotube array is placed on a substrate, an entire first surface of the substrate is in contact with the carbon nanotube array, the carbon nanotube array is between the substrate and the light source, and the carbon nanotube array comprises a plurality of carbon nanotubes substantially perpendicular to the first surface of the substrate; and
    an imaging element spaced from the carbon nanotube array, the imaging element being configured to image the radiation light from the carbon nanotube array, wherein the light source is located on a first side of the carbon nanotube array and the imaging element is located on a second side of the carbon nanotube array opposite to the first side.

2. The system of claim 1, wherein the plurality of carbon nanotubes is substantially parallel to each other.

3. The system of claim 1, wherein the carbon nanotube array is further configured to absorb photons having wavelengths in ranges of infrared light, visible light or ultraviolet light emitted from the light source.

4. The system of claim 1, further comprising a chamber made of light-transparent materials, the carbon nanotube array is in the chamber.

5. The system of claim 4, wherein a pressure in the chamber is in a range from about $10^{-9}$ Pa to about $10^{-3}$ Pa.

6. The system of claim 4, wherein the chamber is between the light source and the imaging element.

7. The system of claim 1, wherein the carbon nanotube array comprises a top surface and a bottom surface opposite to the top surface, the top surface is nearer to the light sources than the bottom surface.

8. The system of claim 7, wherein the carbon nanotube array is further configured so that an irradiating angle between a light beam from the light source and the top surface of the carbon nanotube array is 90 degrees.

9. The system of claim 7, wherein the imaging element is nearer to the bottom surface than the top surface of the carbon nanotube array.

10. The system of claim 7, wherein a distance between the imaging element and the bottom surface of the carbon nanotube array is in a range from about 1 mm to about 100 mm.

11. The system of claim 7, wherein when the system is in operation, the top surface of the carbon nanotube array is irradiated by the photons emitted by the light source, and the carbon nanotube array radiates the radiation light; and the imaging element images the radiation light to obtain an intensity distribution of the light source.

12. The system of claim 1, wherein the imaging element is a charge-coupled device or a complementary metal-oxide-semiconductor.

13. The system of claim 1, wherein the carbon nanotube array is further configured so that a light beam is substantially vertical to a top surface of the carbon nanotube array and parallel to an axis of each of the plurality of carbon nanotubes.

14. The system of claim 1, wherein the first surface of the substrate is a continuous plane.

15. A system for measuring intensity distribution of light comprising:
    a chamber configured to provide a vacuum environment;

a carbon nanotube array comprising a plurality of carbon nanotubes substantially perpendicular to a surface of the carbon nanotube array is in the chamber, wherein the carbon nanotube array is configured to absorb photons emitted from a light source and to radiate radiation light, the carbon nanotube array is placed on a substrate, an entire first surface of the substrate is in contact with the carbon nanotube array, the carbon nanotube array is between the substrate and the light source, and the plurality of carbon nanotubes is substantially perpendicular to the first surface of the substrate; and an imaging element imaging the radiation light from the carbon nanotube array and being spaced from the chamber.

16. The system of claim 15, wherein the chamber is made of light-transparent materials, and the carbon nanotube array is in the chamber.

17. The system of claim 16, wherein a pressure in the chamber is in a range from about $10^{-9}$ Pa to about $10^{-3}$ Pa.

18. A system for measuring intensity distribution of light comprising:

a carbon nanotube array comprising a plurality of carbon nanotubes substantially perpendicular to a surface of the carbon nanotube array and absorbing photons emitted from a light source and radiating radiation light, wherein the carbon nanotube array is placed on a substrate made of zinc selenide, an entire first surface of the substrate is in contact with the carbon nanotube array, the carbon nanotube array is between the substrate and the light source, and the plurality of carbon nanotubes is substantially perpendicular to the first surface of the substrate; and an imaging element imaging the radiation light from the carbon nanotube array and being spaced from the carbon nanotube array, wherein the carbon nanotube array and the imaging element are placed in a chamber with a vacuum environment, the light source is located on a first side of the carbon nanotube array and the imaging element is located on a second side of the carbon nanotube array opposite to the first side, a pressure in the chamber is in a range from about $10^{-9}$ Pa to about $10^{-3}$ Pa, and a distance between the imaging element and the carbon nanotube array is in a range from about 1 mm to about 100 mm.

* * * * *